United States Patent
Chang et al.

(10) Patent No.: US 11,681,113 B2
(45) Date of Patent: Jun. 20, 2023

(54) HEAD MOUNTED DISPLAY

(71) Applicant: HTC Corporation, Taoyuan (TW)

(72) Inventors: Li-Hsun Chang, Taoyuan (TW); Kuan-Ying Ou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 242 days.

(21) Appl. No.: 17/031,902

(22) Filed: Sep. 25, 2020

(65) Prior Publication Data
US 2022/0099910 A1    Mar. 31, 2022

(51) Int. Cl.
*G02B 7/02*    (2021.01)
*G06F 1/16*    (2006.01)

(52) U.S. Cl.
CPC ............. *G02B 7/021* (2013.01); *G06F 1/163* (2013.01)

(58) Field of Classification Search
CPC .............................. G02B 27/021; G06F 1/163
See application file for complete search history.

(56) References Cited

U.S. PATENT DOCUMENTS

| 10,274,696 B2 | 4/2019 | Chou et al. |
| 10,610,775 B1 | 4/2020 | Ebert |
| 2019/0154952 A1* | 5/2019 | Zheng .................... G02B 7/023 |

FOREIGN PATENT DOCUMENTS

| CN | 104898282 | 9/2015 |
| CN | 111638601 | 9/2020 |
| TW | I697695 | 7/2020 |

OTHER PUBLICATIONS

"Office Action of Europe Counterpart Application", dated Jun. 24, 2021, p. 1-p. 6.
"Office Action of Taiwan Counterpart Application", dated May 5, 2021, p. 1-p. 5.
"Search Report of Europe Counterpart Application", dated Jun. 11, 2021, p. 1-p. 4.

* cited by examiner

*Primary Examiner* — Mark Edwards
*Assistant Examiner* — Chayce R Bibbee
(74) *Attorney, Agent, or Firm* — JCIPRNET

(57) ABSTRACT

A head mounted display including a first optical system, a second optical system, a first display, a second display, a first driver and a first adjusting system is provided. The first display is assembled to an object side of the first optical system. The second display is assembled to an object side of the second optical system. The first adjusting system is connected to the first driver, the first optical system, the first display and the second display. The first driver drives the first adjusting system to adjust a distance between the first display and the second display in a first mode. The first driver drives the first adjusting system to adjust a distance between the first display and the first optical system in a second mode.

9 Claims, 20 Drawing Sheets

HEAD MOUNTED DISPLAY

TECHNICAL FIELD

The invention relates to a display, and more particularly, to a head mounted display.

BACKGROUND

With the development of the technology industry, there are quite a few types of head mounted displays nowadays. Taking an eye mask type head mounted display as an example, after the user wears this type of display, in addition to seeing a three-dimensional image, the image will also change as the user's head rotates, which can provide the user with a more immersive experience. Moreover, it can also be applied to the field of Mixed Reality (MR).

However, the eyesight conditions of users are not the same, and even eyeglass prescriptions of the left and right eyes of the same user may be different. In addition, the distance between the eyes is also different for users. In order to allow the same head mounted display to provide the same good experience for different users, some current head mounted displays have the functions of compensating for myopia and adjusting the distance between the eyes. However, every time a distance adjustment function is provided, a driver must be used, which makes it difficult to reduce the cost, volume, and weight of the head mounted display.

SUMMARY

The invention provides a head mounted display to solve the problems encountered when adjusting optical parameters.

The head mounted display of the invention includes a first optical system, a second optical system, a first display, a second display, a first driver and a first adjusting system. The first display is assembled to an object side of the first optical system. The second display is assembled to an object side of the second optical system. The first adjusting system is connected to the first driver, the first optical system, the first display and the second display. The first driver drives the first adjusting system to adjust a distance between the first display and the second display in a first mode. The first driver drives the first adjusting system to adjust a distance between the first display and the first optical system in a second mode.

Based on the above, in the head mounted display of the invention, the distance between two displays and the distance between one display and the optical system can be adjusted with only one driver. Therefore, the number of the drivers can be reduced to reduce the cost, volume and weight.

DESCRIPTION OF THE EMBODIMENTS

Figure 1:
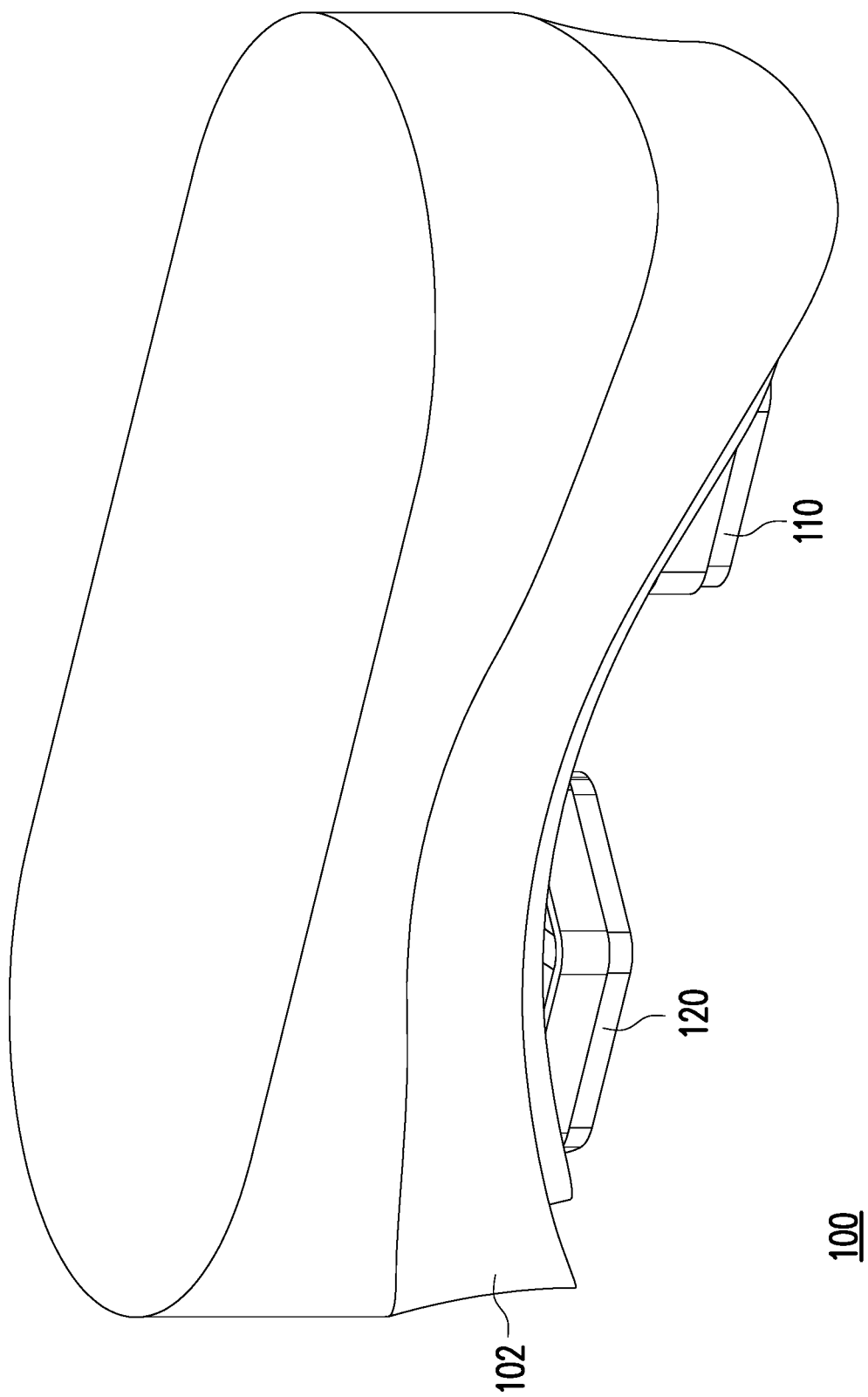
FIG. 1 is a schematic diagram of a head mounted display in a first embodiment of the invention.
Figure 2:
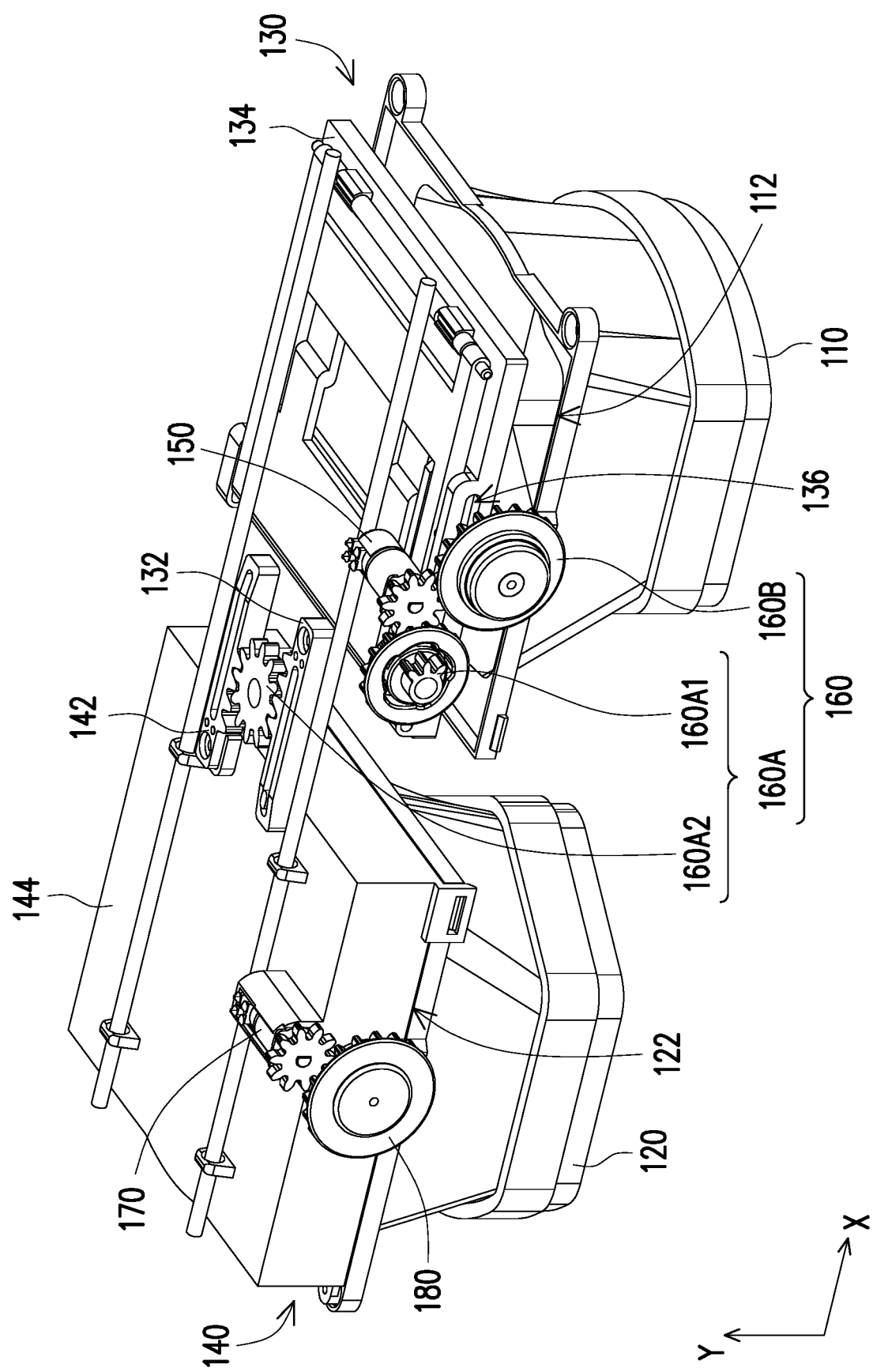
FIG. 2 is a schematic diagram of the head mounted display of FIG. 1 with an outer shell and an inner shell removed.

FIG. 1 is a schematic diagram of a head mounted display in a first embodiment of the invention. FIG. 2 is a schematic diagram of the head mounted display of FIG. 1 with an outer shell and an inner shell removed. Referring to FIG. 1 and FIG. 2, a head mounted display 100 of this embodiment includes a first optical system 110, a second optical system 120, a first display 130, a second display 140, a first driver 150 and a first adjusting system 160. Based on aesthetic requirements, the head mounted display 100 of this embodiment may further include an outer shell 102. Among the above elements, for example, only the first optical system 110 and the second optical system 120 are partially exposed outside the outer shell 102 for the user to view images displayed by the first display 130 and the second display 140 through the first optical system 110 and the second optical system 120. The first display 130, the second display 140, the first driver 150 and the first adjusting system 160 are all installed in the outer shell 102.

The first display 130 is assembled to an object side 112 of the first optical system 110. A side of the first optical system 110 opposite to the object side 112 is an image side. That is, the image displayed by the first display 130 on the object side 112 passes through the first optical system 110 for the user to view from the image side. The first optical system 110 is, for example, composed of one or more lenses. The second display 140 is assembled to an object side 122 of the second optical system 120. That is, the image displayed by the second display 140 on the object side 122 passes through the second optical system 120 for the user to view from the image side. The second optical system 120 is, for example, composed of one or more lenses. The first adjusting system 160 is connected to the first driver 150, the first optical system 110, the first display 130 and the second display 140. The first driver 150 drives the first adjusting system 160 to adjust a distance between the first display 130 and the second display 140 in a first mode. In other words, in the first mode, the first driver 150 adjusts the distance between the first display 130 and the second display 140 through the first adjusting system 160 to meet the needs of users with different interpupillary distances (IPD). The first driver 150 drives the first adjusting system 160 to adjust a distance between the first display 130 and the first optical system 110 in a second mode. In other words, in the second mode, the first driver 150 adjusts the distance between the first display 110 and the second display 130 through the first adjusting system 160 to meet the needs of users with different eyesight conditions.

It can be seen from the above that in the head mounted display 100 of this embodiment, through the combination of the first driver 150 and the first adjusting system 160, not only can the distance between the first display 130 and the second display 140 be adjusted, the distance between the first display 130 and the first optical system 110 can also be adjusted. Compared with the conventional technology in which one driver can adjust only one distance, the head mounted display 100 of this embodiment can save the number of drivers used to thereby reduce cost, volume and weight.

Figure 3A:
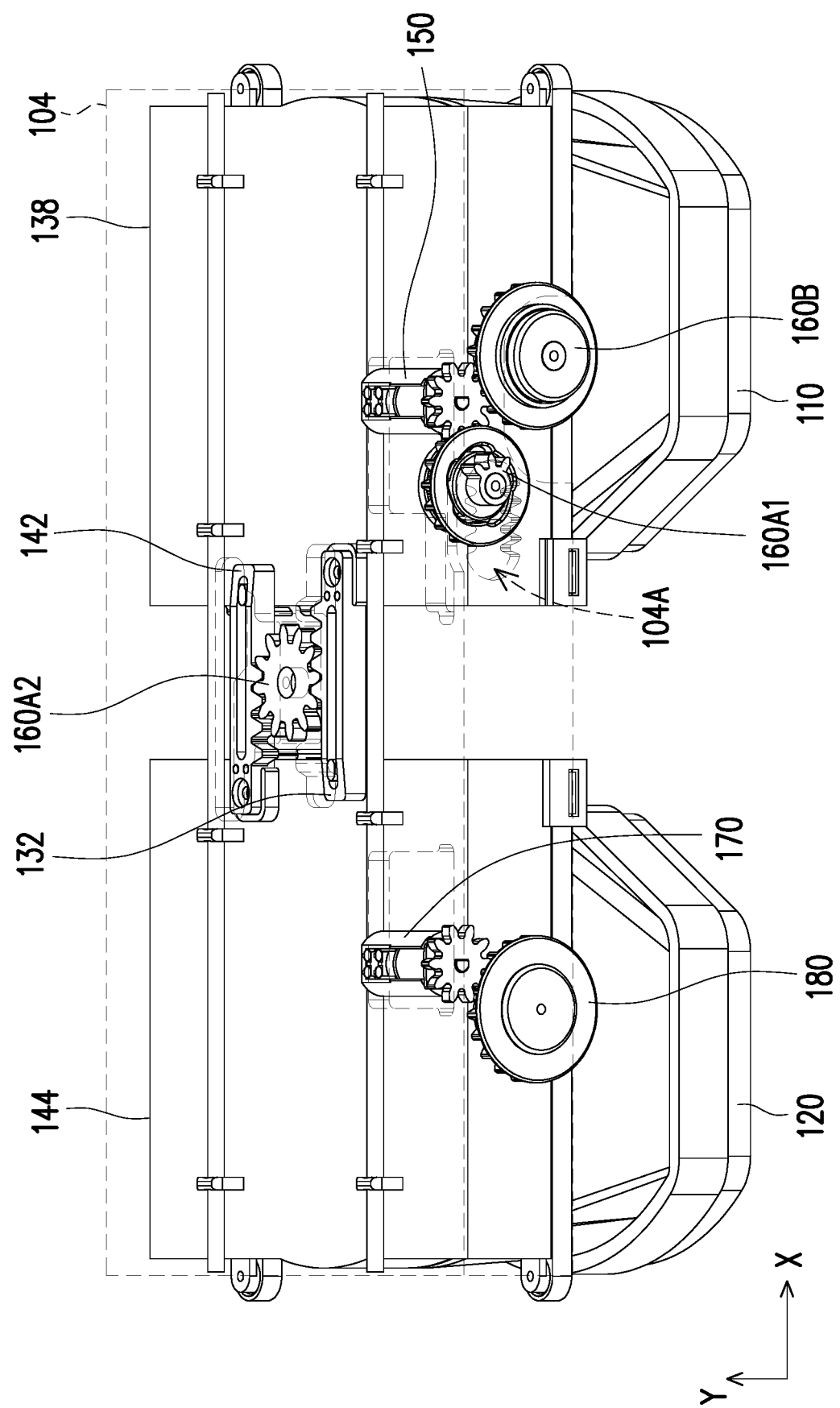
FIG. 3A and FIG. 3B are schematic diagrams of two states of the head mounted display of FIG. 1 with the outer shell removed.
Figure 3B:
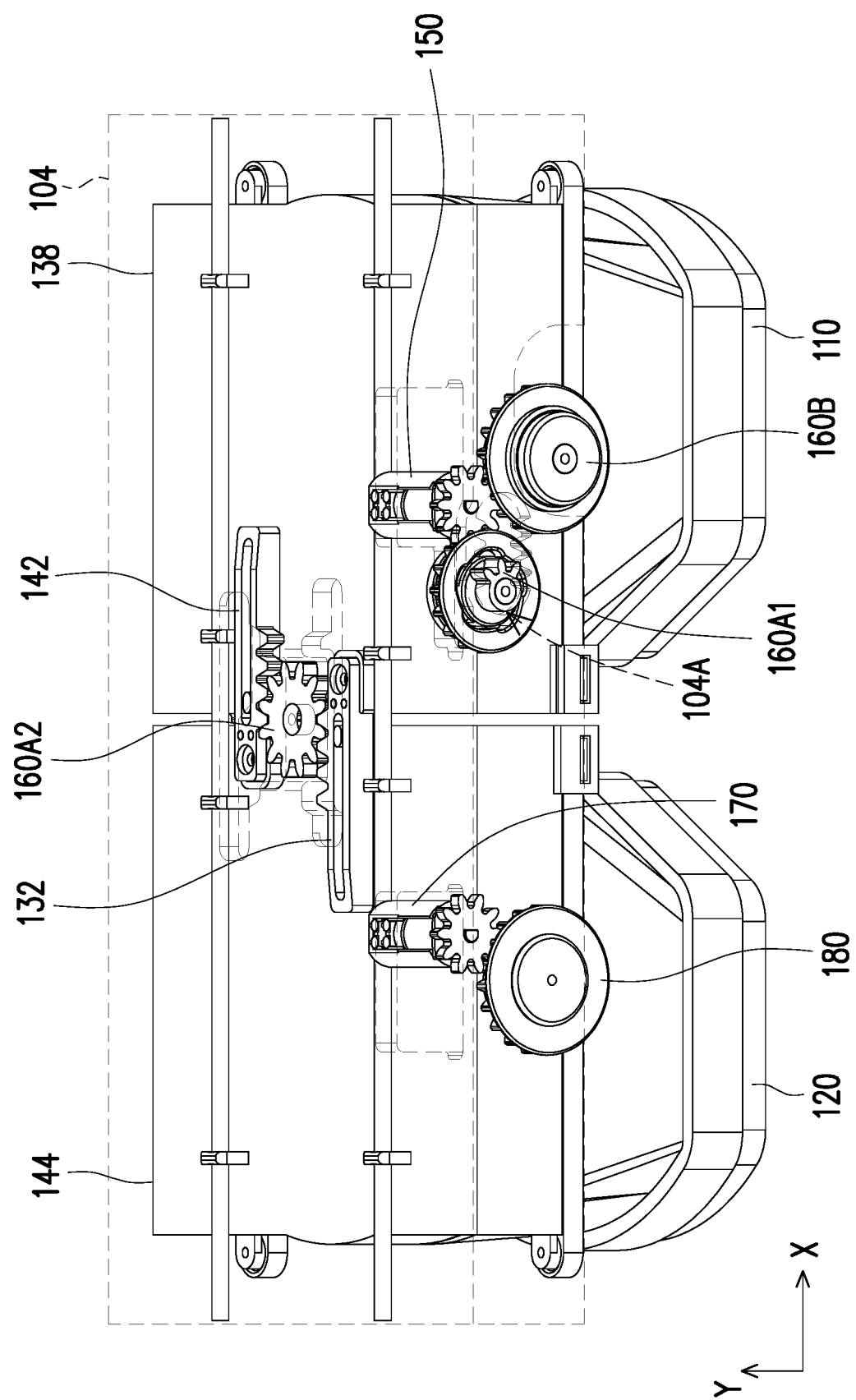
Figure 3C:
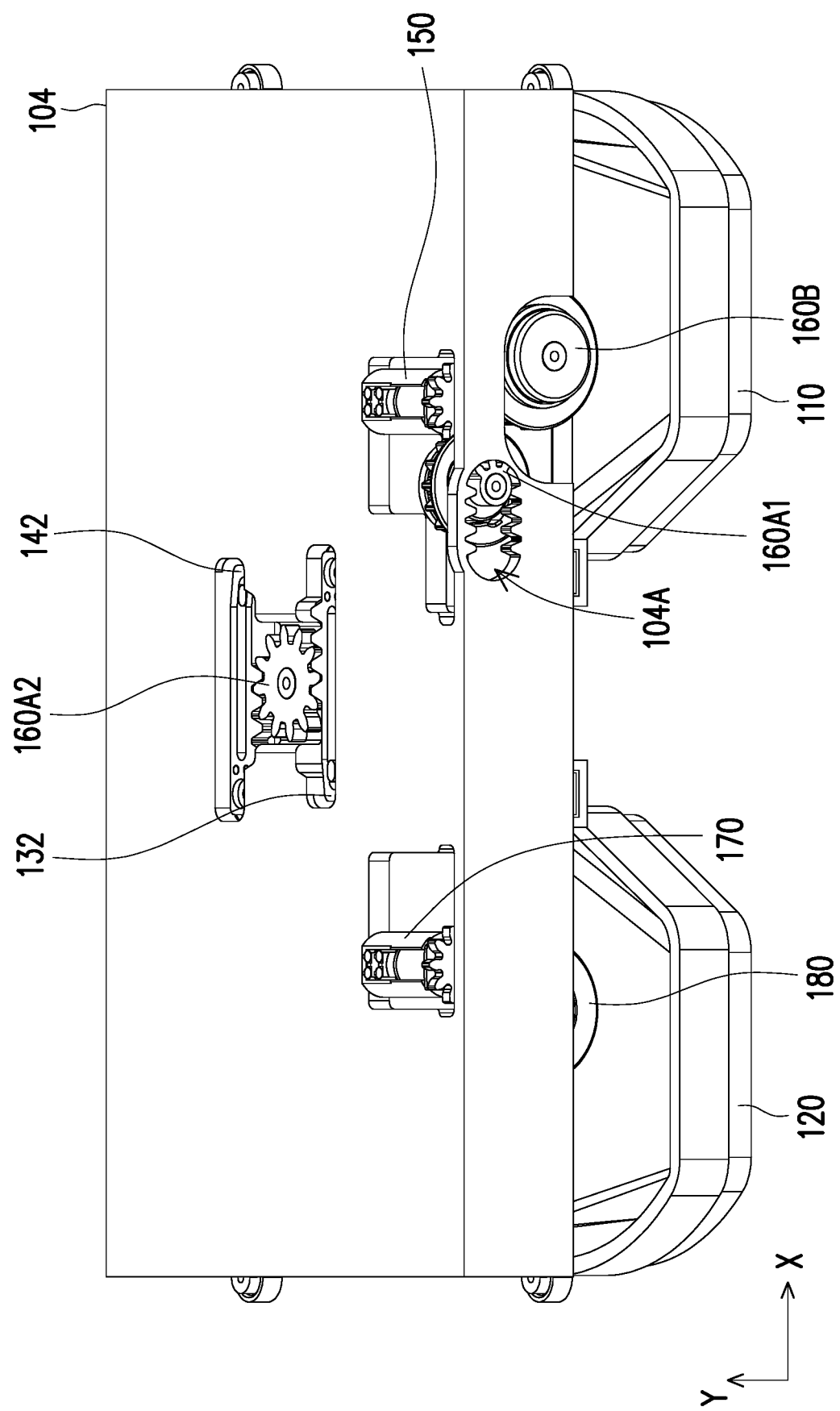
FIG. 3C is a schematic diagram of the inner shell in FIG. 3A shown in solid lines with components therebelow shielded.

FIG. 3A and FIG. 3B are schematic diagrams of the head mounted display of FIG. 1 with the outer shell removed. FIG. 3C is a schematic diagram of the inner shell shown in solid lines in FIG. 3A with components therebelow shielded. Referring to FIG. 2 and FIG. 3A, the head mounted display 100 (marked in FIG. 1) of this embodiment further includes an inner shell 104 covering the first display 130, the second display 140, the first driver 150 and the first adjusting system 160. The inner shell 104 has an internal gear hole 104A. The first adjusting system 160 of this embodiment includes, for example, a first sub-system 160A and a second sub-system 160B. The first driver 150 is, for example, a motor. Each of the first sub-system 160A and the second sub-system 160B is, for example, a gear system (i.e., composed of one or more gears). The first sub-system 160A includes, for example, a reciprocating gear 160A1 and a driven gear 160A2. For example, the first driver 150 is fixed to the first display 130. That is to say, the first driver 150 moves with the first display 130. For example, the first driver 150 drives the reciprocating gear 160A1 when rotating forward. For example, the reciprocating gear 160A1 is a ratchet. The reciprocating gear 160A1 transmits the rotation to its output end in contact with the internal gear hole 104A of the inner shell 104 only when the first driver 150 rotates forward.

FIG. 3C is a schematic diagram of the inner shell in FIG. 3A shown in solid lines with components therebelow shielded. Referring to FIG. 3A and FIG. 3C, due to the cooperation between the output end of the reciprocating gear 160A1 and the internal gear hole 104A of the inner shell 104, the reciprocating gear 160A1 reciprocates relative to the inner shell 104 when rotating. When reciprocating relative to the inner shell 104, the reciprocating gear 160A1 also drives the first driver 150 and the first display 130 to reciprocate relative to the inner shell 104 on the X axis. Therefore, the position of the first display 130 relative to the inner shell 104 changes between the two states of FIG. 3A and FIG. 3B.

In addition, when the first display 130 reciprocates relative to the inner shell 104, a rack 132 of the first display 130 drives the driven gear 160A2 of the first sub-system 160A to rotate. When rotating, the driven gear 160A2 drives a rack 142 of the second display 140 to reciprocate relative to the inner shell 104 on the X axis and thereby drive the entire second display 140 to reciprocate relative to the inner shell 104 on the X axis. For example, in the state of FIG. 3A, the first driver 150 drives the reciprocating gear 160A1 to rotate, and the cooperation of the reciprocating gear 160A1 and the internal gear hole 104A causes the first display 130 to move toward the middle relative to the inner shell 104 on the X axis. At the same time, the rack 132 of the first display 130 drives the driven gear 160A2 to rotate clockwise, and the driven gear 160A2 drives the rack 142 to move to the right on the X axis and thereby drive the second display 140 to move toward the middle relative to the inner shell 104 on the X axis. Eventually, the state of FIG. 3A is changed to the state of FIG. 3B.

In this way, the first driver 150 can adjust the distance between the first display 130 and the second display 140 when rotating forward. In this embodiment, the rack 142 is fixed on an outer shell 144 of the second display 140, and the rack 132 is fixed on an outer shell 138 of the first display 130. Because the outer shell 138 of the first display 130 fixed to the first optical system 110 and the outer shell 144 of the second display 140 fixed to the second optical system 120 can drive the first optical system 110 and the second optical system 120 to move on X axis, the head mounted display 100 can meet the needs of users with different interpupillary distances (IPD).

Figure 4:
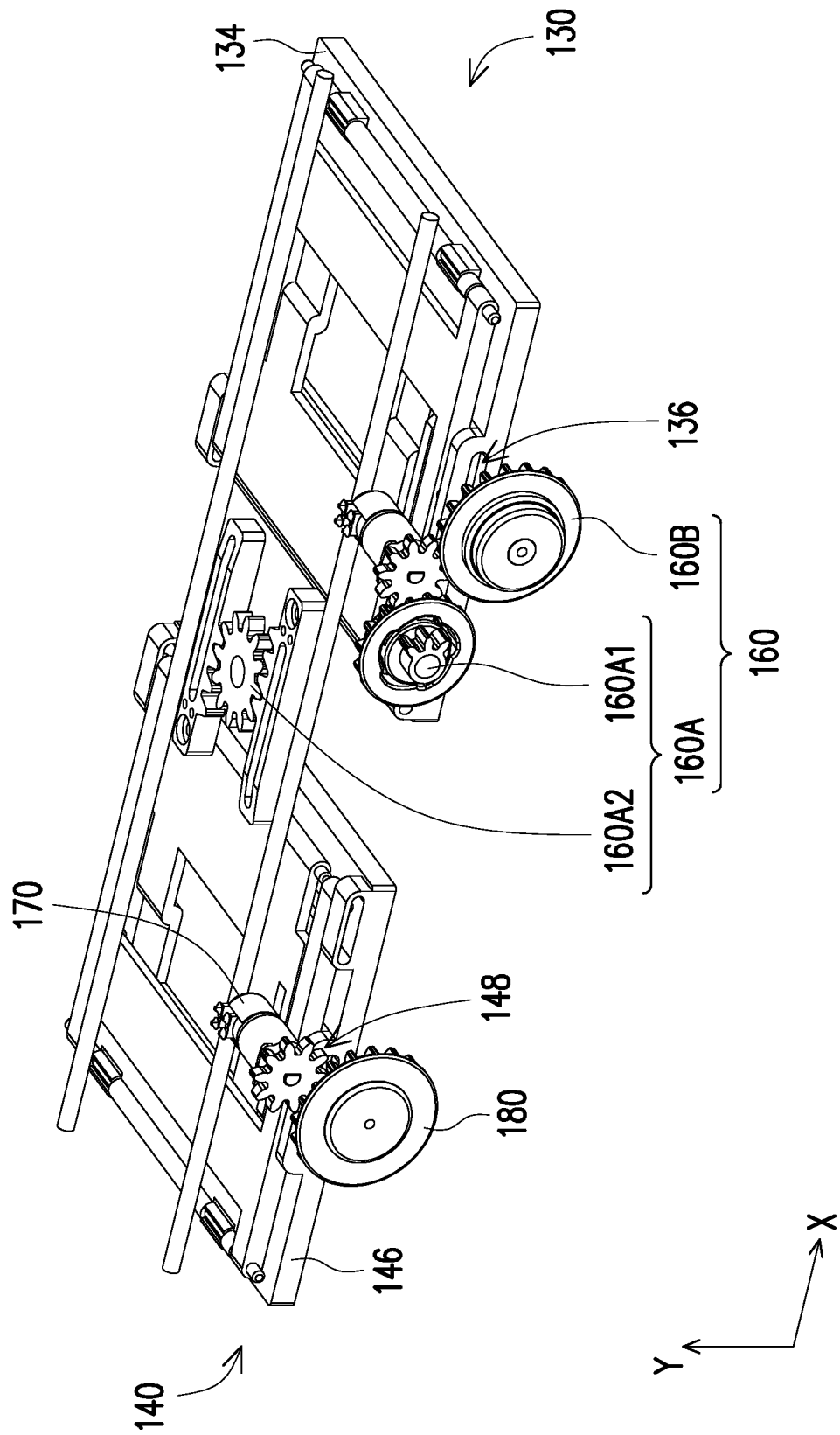
FIG. 4 is a schematic diagram of FIG. 3A with the inner shell of the head mounted display and outer shells of displays removed.

FIG. 4 is a schematic diagram of FIG. 3A with the inner shell of the head mounted display and outer shells of displays removed. Referring to FIG. 4, when rotating backward, the first driver 150 drives the second sub-system 160B to adjust the distance between the first display 130 and the first optical system 110 on the Y axis in the second mode. For example, the second sub-system 160B is a ratchet. The second sub-system 160B transmits the rotation only when the first driver 150 rotates backward. The so-called "rotating forward" and "rotating backward" described here are only used to distinguish the two rotations in opposite directions, but it does not limit which rotation is forward or backward. When the rotation of the first driver 150 is indeed transmitted to an output end of the second sub-system 160B (e.g., a protruding rod; not shown), the output end of the second sub-system 160B performs a circular motion. Since the output end of the second sub-system 160B is inserted into a sliding groove 136 of a display element 134 of the first display 130, the output end of the second sub-system 160B that performs the circular motion can drive the display element 134 to reciprocate on the Y axis perpendicular to an extending direction of the sliding groove 136. Specifically, the display element 134 reciprocates on the Y axis to move closer to and away from the first optical system 110. Although the outer shell 138 (shown in FIG. 3A) of the first display 130 is fixed to the first optical system 110, the display element 134 of the first display 130 can move relative to the outer shell 138 of the first display 130. Therefore, the distance between the first optical system 110 and the display element 134 of the head mounted display 100 can be adjusted to meet the needs of users with different eyesight conditions.

Referring to FIG. 2 and FIG. 4, the head mounted display 100 of this embodiment further includes a second driver 170 and a second adjusting system 180. The second adjusting system 180 is connected to the second driver 170, the second optical system 120 and the second display 140. The second driver 170 drives the second adjusting system 180 to adjust a distance between the second display 140 and the second optical system 120 on the Y axis in a third mode. Therefore, a distance between the second optical system 120 and a display element 146 of the second display 140 of the head mounted display 100 can meet the needs of users with different eyesight conditions. For instance, the second driver 170 is a motor. The second adjusting system 180 is a gear system (i.e., composed of one or more gears). The second driver 170 and the second adjusting system 180 are fixed on the outer shell 144 of the second display 140. When the second driver 170 rotates, an output end (e.g., a protruding rod; not shown) of the second adjusting system 180 performs a circular motion. Since the output end of the second adjusting system 180 is inserted into a sliding groove 148 of the display element 146 of the second display 140, the output end of the second sub-system 160B that performs the circular motion can drive the display element 146 to reciprocate on the Y axis perpendicular to an extending direction of the sliding groove 148. Specifically, the display element 146 reciprocates on the Y axis to move closer to and away from the second optical system 120.

Figure 5:
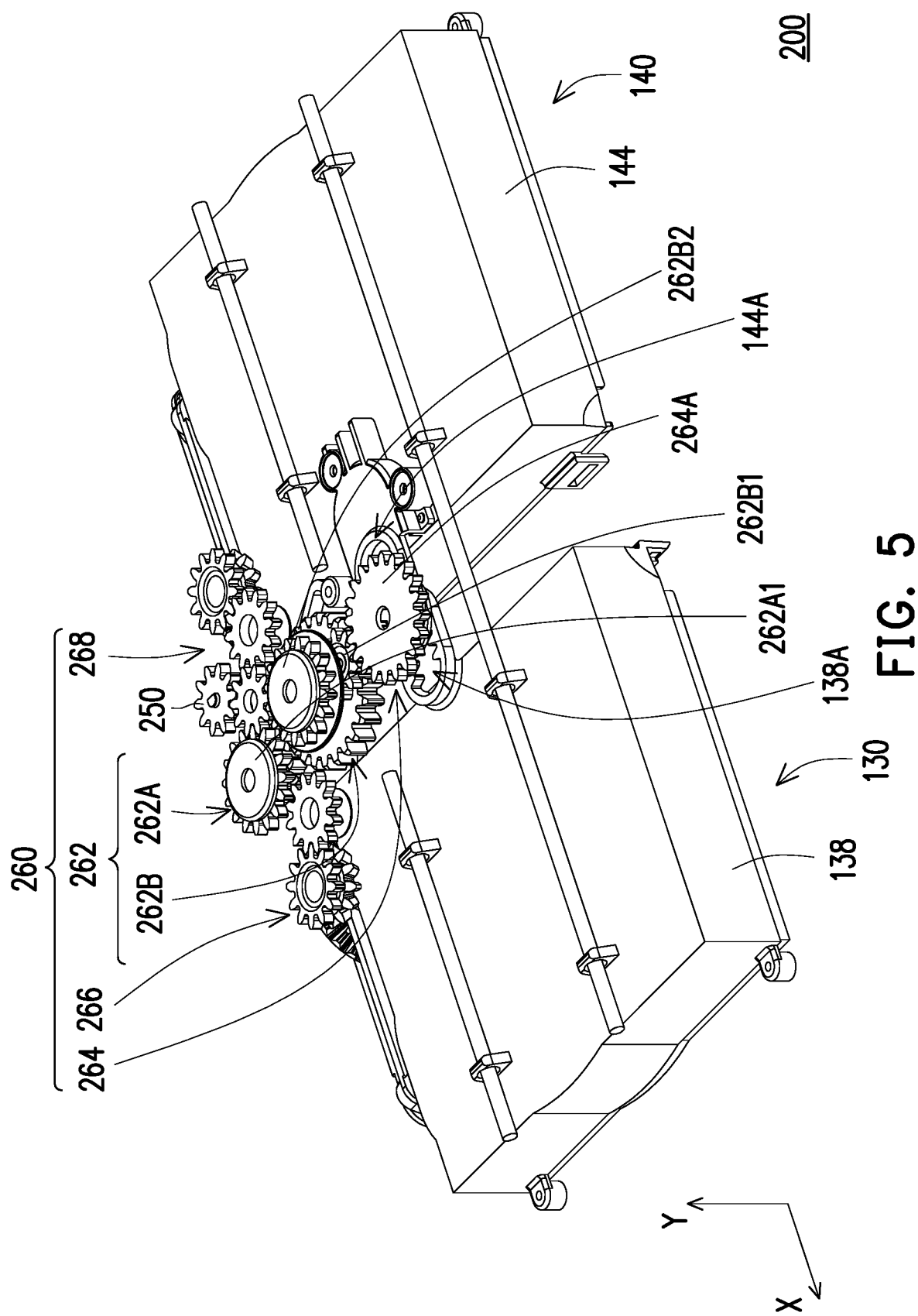
FIG. 5 is a schematic diagram of a head mounted display with an outer shell, an optical system and an inner shell removed in a second embodiment of the invention.

FIG. 5 is a schematic diagram of a head mounted display with an outer shell, an optical system and an inner shell removed in a second embodiment of the invention. A head mounted display 200 of this embodiment is substantially the same as the head mounted display 100 in the embodiment of FIG. 1, and only the differences between the two are described as follows. In the head mounted display 200 of this embodiment, a first adjusting system 260 is connected to a first driver 250, the first optical system 110, the second optical system 120, the first display 130 and the second display 140. The first driver 250 drives the first adjusting system 260 to adjust the distance between the first display 130 and the second display 140 on the X axis in the first mode. In other words, in the first mode, the first driver 250 adjusts the distance between the first display 130 and the second display 140 through the first adjusting system 260 to meet the needs of users with different interpupillary distances (IPD). The first driver 250 drives the first adjusting system 260 to adjust the distance between the first display 130 and the first optical system 110 on the Y axis in the second mode. In other words, in the second mode, the first driver 250 adjusts the distance between the first display 110 and the second display 130 through the first adjusting system 260 to meet the needs of users with different eyesight conditions. The first driver 250 drives the first adjusting system 260 to adjust the distance between the second display 140 and the second optical system 120 on the Y axis in the third mode. In other words, in the third mode, the first driver 250 adjusts the distance between the second optical system 120 and the second display 140 through the first adjusting system 260 to meet the needs of users with different eyesight conditions.

It can be seen from the above that in the head mounted display 200 of this embodiment, through the combination of the first driver 250 and the first adjusting system 260, the distance between the first display 130 and the second display 140 on the X axis, the distance between the first display 130 and the first optical system 110 on the Y axis and the distance between the second display 140 and the second optical system 120 on the Y axis can be adjusted. Compared with the conventional technology in which one driver can adjust only one distance, the head mounted display 100 of this embodiment can adjust three distances with only one driver to save the number of drivers used and thereby reduce cost, volume and weight.

The first adjusting system 260 of this embodiment includes a switching system 262, a first sub-system 264, a second sub-system 266, and a third sub-system 268. In the first mode, the switching system 262 connects to the first sub-system 264 and disconnects from the second sub-system 266 and the third sub-system 268. In the second mode, the switching system 262 connects to the second sub-system 266 and disconnects from the first sub-system 264 and the third sub-system 268. In the third mode, the switching system 262 connects to the third sub-system 268 and disconnects from the first sub-system 264 and the second sub-system 266. In other words, because the switching system 262 is provided, the first driver 250 can adjust three distances through the three sub-systems. Naturally, in other embodiments, the number of sub-systems may also be increased so that the first driver 250 can adjust more distances.

The first driver 250 of this embodiment is, for example, a motor. Each of the switching system 262, the first sub-system 264, the second sub-system 266 and the third sub-system 268 is, for example, a gear system (i.e., composed of one or more gears). Although each gear system may include multiple gears, only the actions of key gears are described here, whereas the actions of gears such as transmission and steering gears are omitted.

Figure 6:
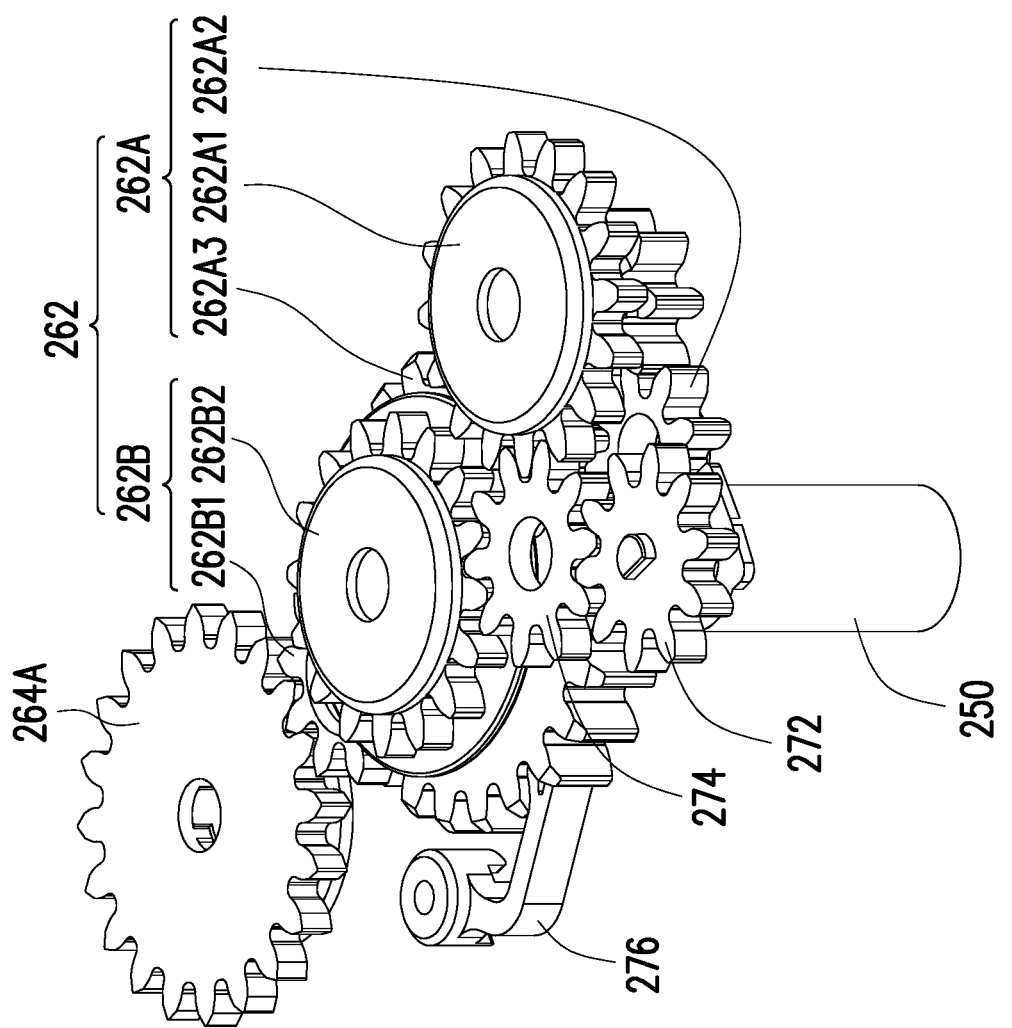
FIG. 6 is a schematic diagram of a first driver and a switching system of the head mounted display of FIG. 5.

FIG. 6 is a schematic diagram of a first driver and a switching system of the head mounted display of FIG. 5. Referring to FIG. 5 and FIG. 6, the switching system 262 includes a transposition system 262A and a transmission system 262B. When rotating backward, the first driver 250 drives the transposition system 262A to move a transmission part 262B1 of the transmission system 262B to contact the first sub-system 264, the second sub-system 266 or the third sub-system 268. In other words, when rotating backward, the first driver 250 can move the transmission part 262B1 between three positions through the transposition system 262A, and the transmission part 262B1 can only contact one of the first sub-system 264, the second sub-system 266 and the third sub-system 268 at each position.

For instance, a gear 262A1 of the transposition system 262A in contact with the first driver 150 is a ratchet, and a gear 262B2 of the transmission system 262B in contact with the first driver 150 is a ratchet. The first driver 150 drives a gear 274 through a gear 272, and the gear 274 is used to drive the gear 262A1 and the gear 262B2. By design, when the first driver 150 rotates backward, only the gear 262A1 of the transposition system 262A can transmit the rotation; when the first driver 150 rotates forward, only the gear 262B1 of the transmission system 262B can transmit the rotation.

Figure 7:
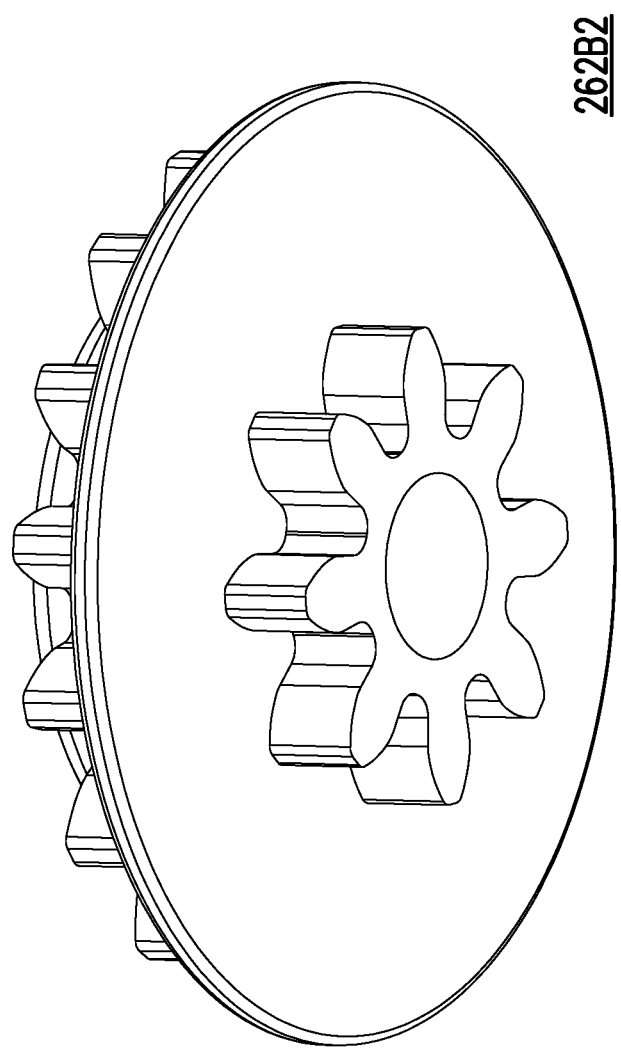
FIG. 7 is a 3D view of a gear of a transmission system of FIG. 5 from angle of elevation.

FIG. 7 is a 3D view of a gear of a transmission system of FIG. 5 from angle of elevation. Referring to FIG. 6 and FIG. 7, the gear 262B2 is taken as an example to illustrate an operation of the ratchet, but the specific design of the ratchet is not limited thereto. In addition, the gear 262A1, the second sub-system 160B and the reciprocating gear 160A1 of FIG. 2 can all adopt similar designs. In addition to an upper side of the gear 262B2 having teeth for contacting the gear 274 (from the viewing angle of FIG. 6), a lower side of the gear 262B2 also has teeth for contacting the transmission part 262B1 (from the viewing angle of FIG. 7).

Figure 8:
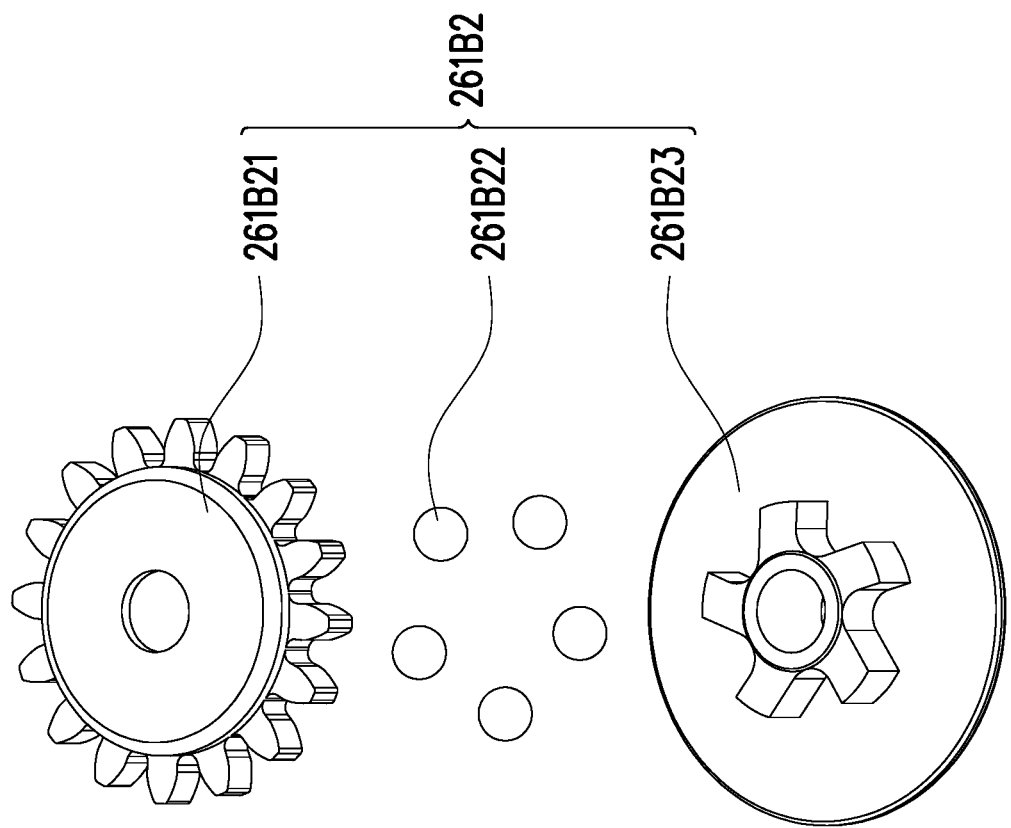
FIG. 8 is an explosion view of the gear of FIG. 7 from angle of depression.

FIG. 8 is an explosion view of the gear of FIG. 7 from angle of depression. Specifically, the gear 262B2 includes an upper gear 262B21, a plurality of balls 262B22 and a lower gear 262B23. The balls 262B22 are sandwiched between the upper gear 262B21 and the lower gear 262B23.

Figure 9:
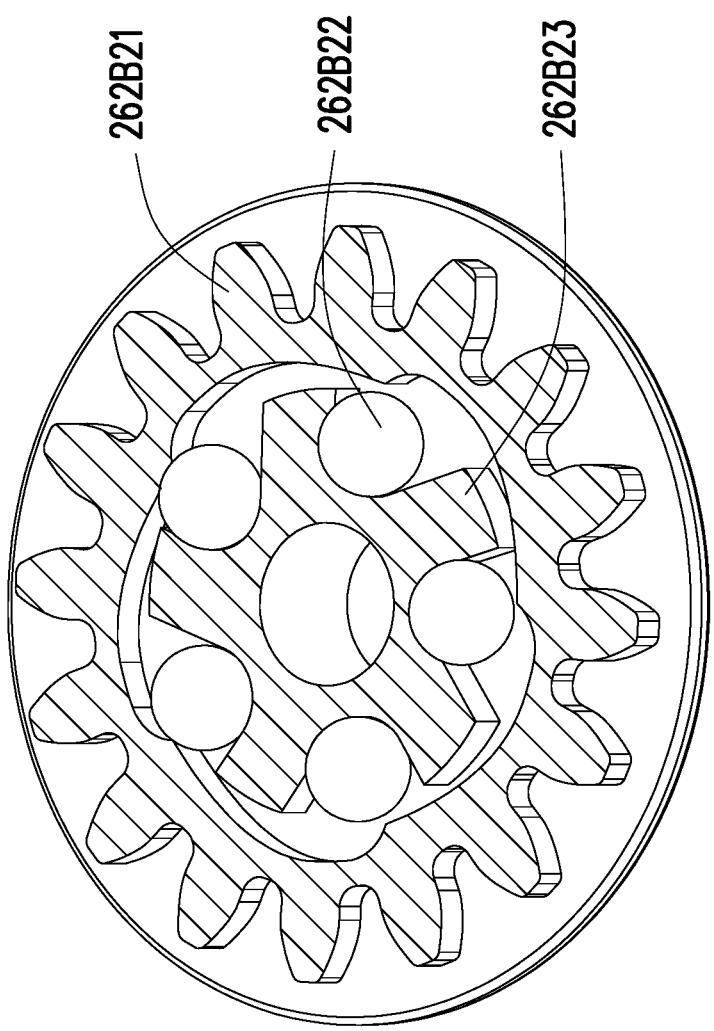
FIG. 9 and FIG. 10 are cross-sectional views of the gear of FIG. 7 in two states.
Figure 10:
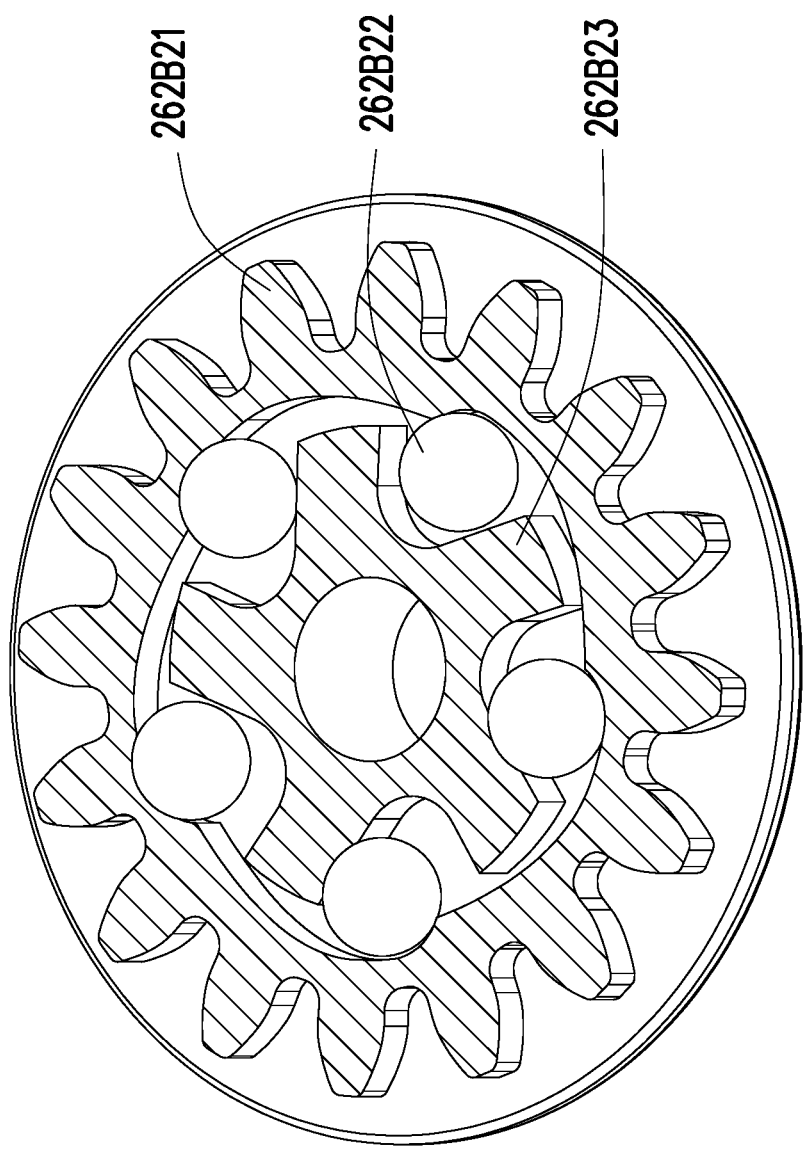

FIG. 9 and FIG. 10 are cross-sectional views of the gear of FIG. 7 in two states. Referring to FIG. 6 and FIG. 9, when the upper gear 262B21 is driven by the gear 274 to rotate counterclockwise, the balls 262B22 are pushed closer to the center so that the upper gear 262B21 cannot drive the lower gear 262B23 through the balls 262B22. In other words, when driving the gear 272 to rotate counterclockwise, the first driver 250 can drive the gear 274 to rotate clockwise and drive the upper gear 262B21 to rotate counterclockwise, but cannot drive the lower gear 262B23 to rotate. Referring to FIG. 6 and FIG. 9, when the upper gear 262B21 is driven by the gear 274 to rotate clockwise, the ball 262B22 are pushed to positions farther away from the center so that the upper gear 262B21 can drive the lower gear 262B23 through the balls 262B22. In other words, when driving the gear 272 to rotate clockwise, the first driver 250 drives the gear 274 to rotate counterclockwise and drives the upper gear 262B21 to rotate clockwise. At this time, the lower gear 262B23 can be driven to rotate clockwise.

Figure 11:
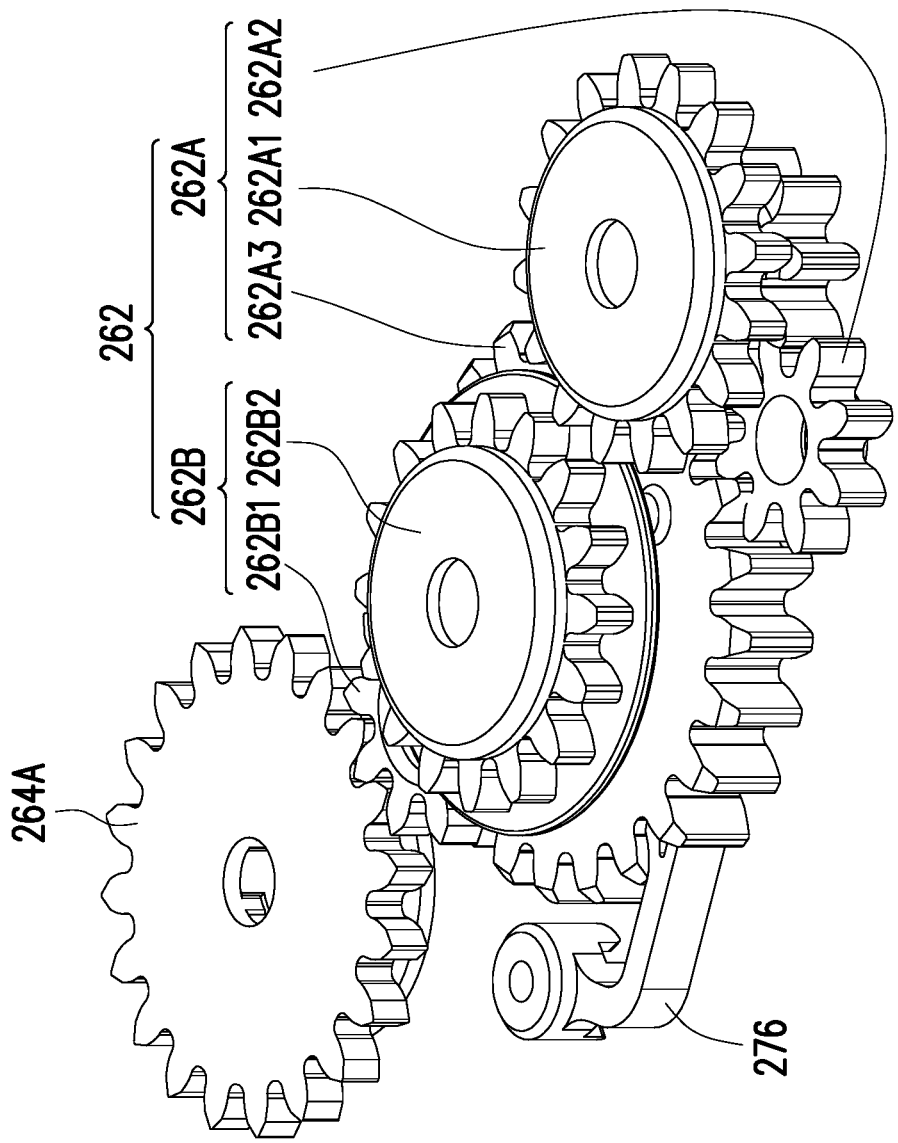
FIG. 11 is a schematic diagram of FIG. 6 with part of gears and a first driver removed.

The operation of the gear 262B2 used as the ratchet can be understood from the above description. Similarly, the operation of the gear 262A1, the second sub-system 160B and the reciprocating gear 160A1 of FIG. 2 used as the ratchets are omitted here. FIG. 11 is a schematic diagram of FIG. 6 with part of gears and a first driver removed. Referring to FIG. 6 and FIG. 11, when the first driver 250 rotates backward (here, rotates counterclockwise), the lower gear 262B23 of the gear 262B2 will not be driven. At the same time, when the first driver 250 rotates backward, the gear 262A1 of the driven transposition system 262A can drive the gear 262A2, and then drive the gear 262A3. When the gear 262A3 rotates, the position of the transmission part 262B1 of the transmission system 262B mounted on the gear 262A3 can be changed. Therefore, when rotating backward, the first driver 250 can move the transmission part 262B1 between the three positions, and the transmission part 262B1 can contact only one of the first sub-system 264, the second sub-system 266, and the third sub-system 268 marked in FIG. 5 at each of the three positions. After the transmission part 262B1 is moved to the desired position, the transmission part 262B1 is responsible for driving the first sub-system 264, the second sub-system 266 or the third sub-system 268 that is being contacted. A hook 276 may be provided to prevent displacement during the driving process from making the transmission part 262B1 unable to contact the first sub-system 264, the second sub-system 266, or the third sub-system 268. The hook 276 can prevent the gear 262A3 from rotating clockwise sp as to fix the position of the transmission part 262B1.

Figure 12:
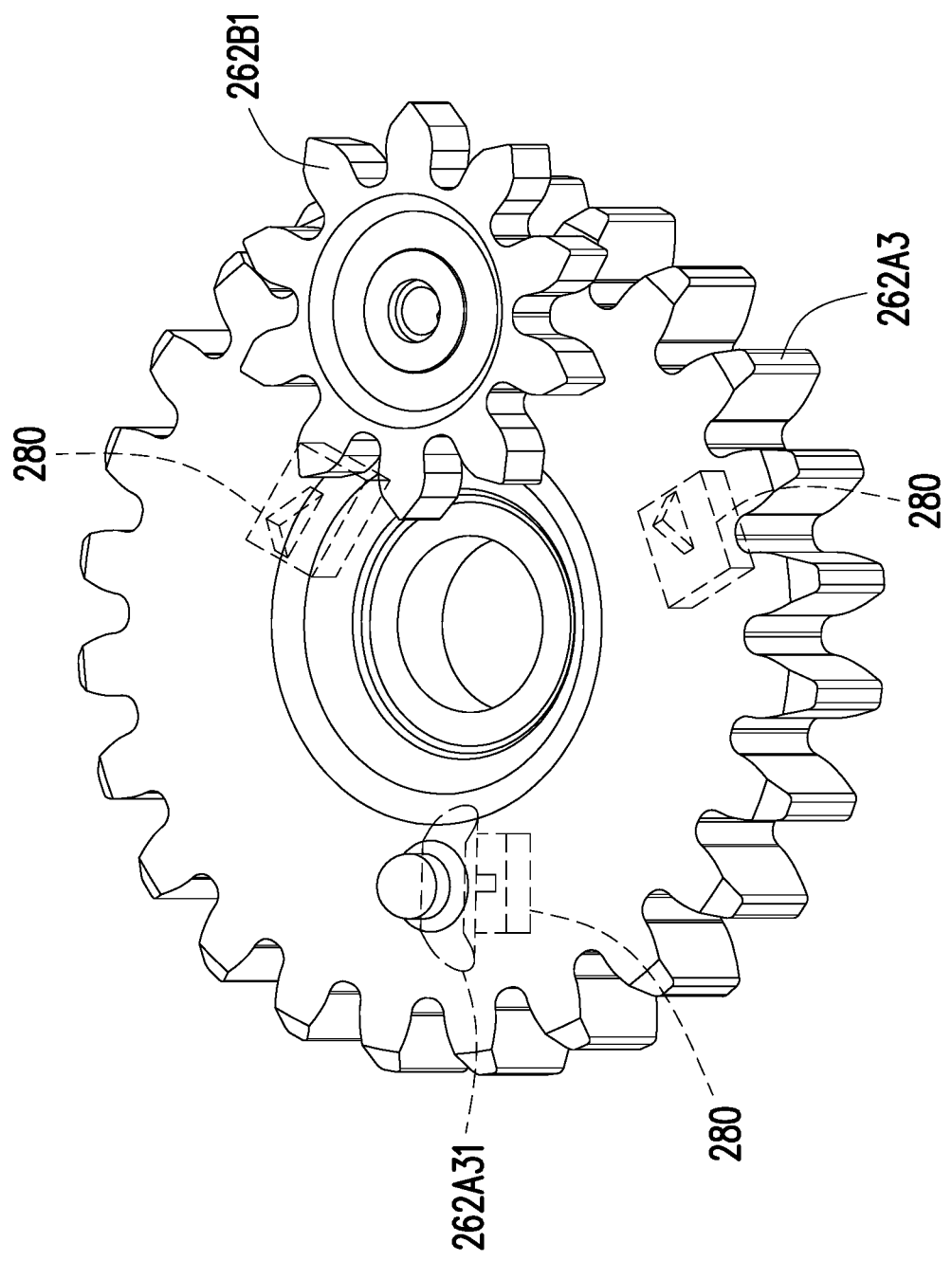
FIG. 12 is a schematic diagram of part of gears of FIG. 6.

FIG. 12 is a schematic diagram of part of gears of FIG. 6. Referring to FIG. 12, in order to determine the position of the transmission part 262B1, three switches 280 may be provided under the gear 262A3 and a rib 262A31 may be provided on a lower side of the gear 262A3, so as to make sure that the transmission part 262B1 reaches the position and can drive which of the first sub-system 264, the second sub-system 266 and the third sub-system 268 marked in FIG. 5, for example. When the gear 262A3 rotates, the rib 262A31 can switch the contacted switch 280. According to a signal sent when the switches 280 are switched, the position of the transmission part 262B1 can be determined. In this embodiment, the switches 280 are fixed to the inner shell (not shown) of the head mounted display 200 (marked in FIG. 5), but the invention is not limited thereto. The inner shell of the head mounted display 200 described here is substantially the same as the inner shell 104 of FIG. 3A.

Figure 13:
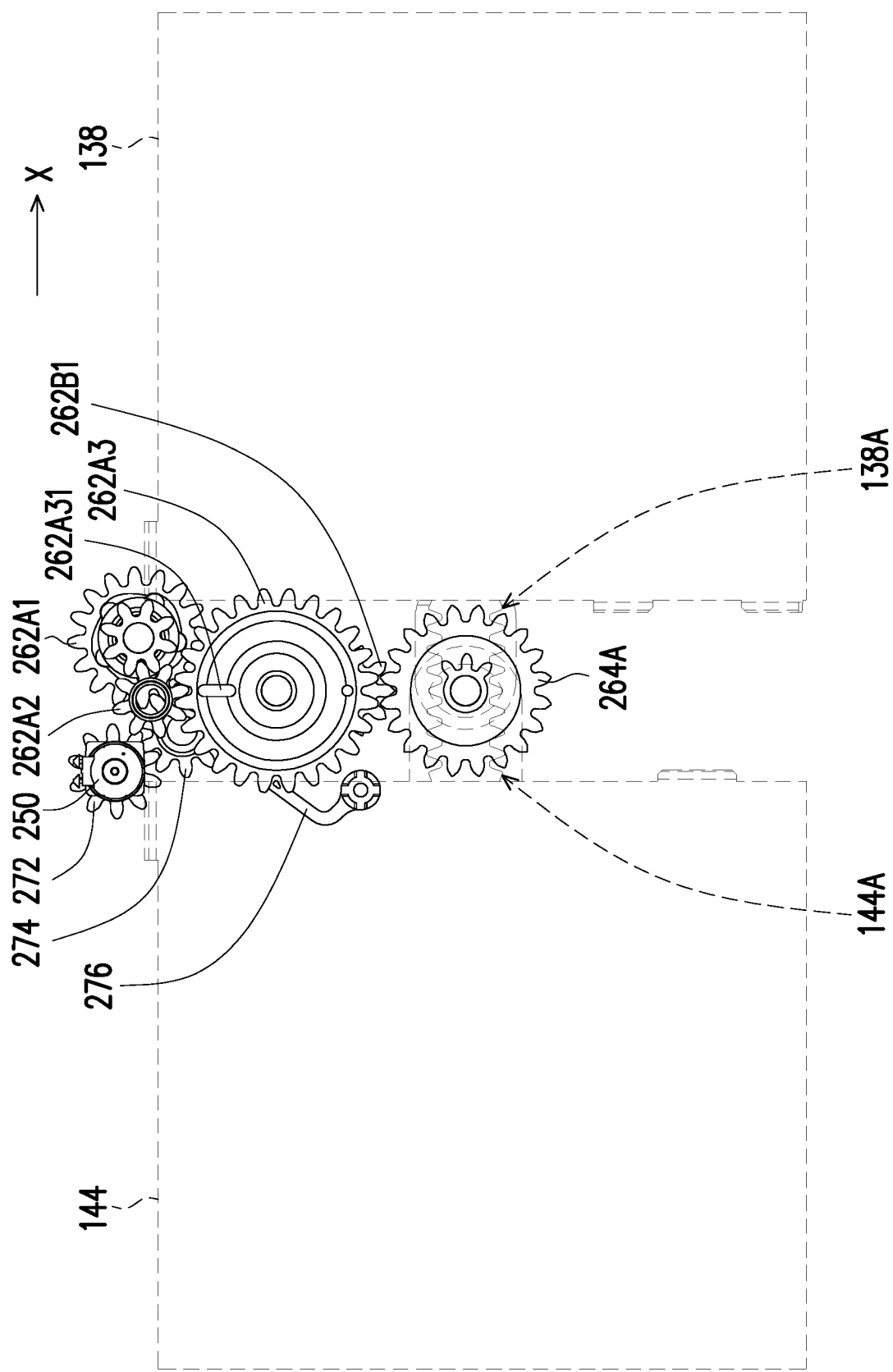
FIG. 13 is a bottom view of FIG. 5.
Figure 14:
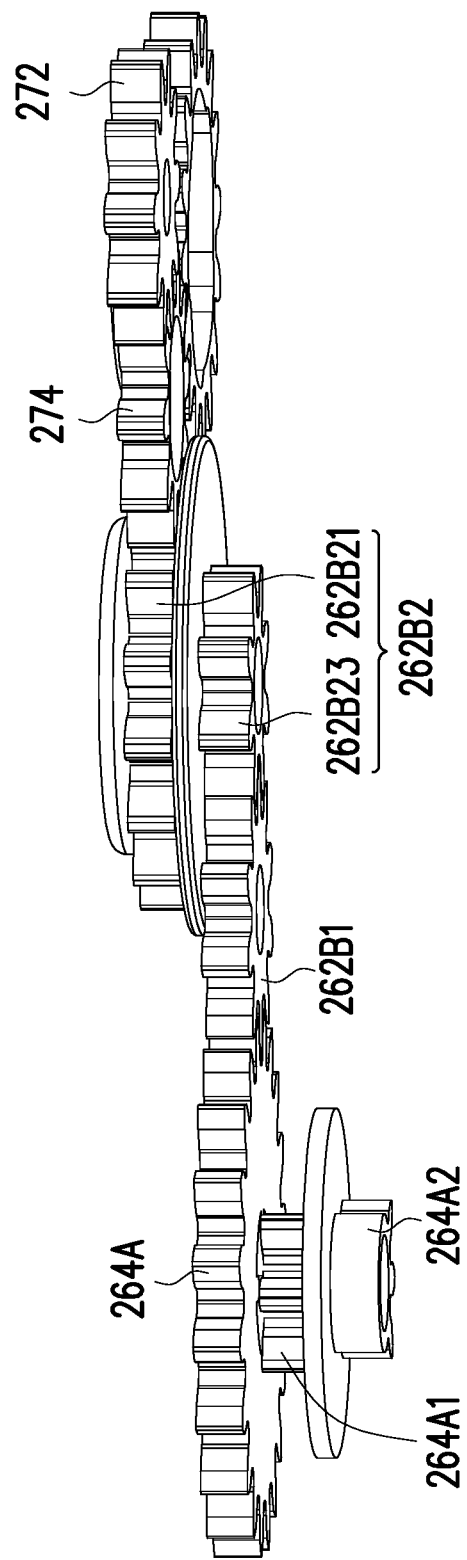
FIG. 14 is an elevation perspective view of FIG. 11 with part of gears removed from angle of elevation.

FIG. 13 is a bottom view of FIG. 5. Referring to FIG. 5 and FIG. 13, after the gear 262A1 of the transposition system 262A enables the transmission part 262B1 to contact the first sub-system 264, the first driver 250 changes to rotate forward. The first driver 250 in FIG. 5 rotates clockwise, and the first driver 250 in FIG. 13 rotates counterclockwise. At this time, the rotation of the first driver 250 can be transmitted from the gear 262B2 and the transmission part 262B1 of the transmission system 262B to the contacted first sub-system 264. FIG. 14 is an elevation perspective view of FIG. 11 with the part of gears removed. Referring to FIG. 13 and FIG. 14, when the first driver 250 rotates forward (rotates counterclockwise in FIG. 14) while the driving gear 272 rotates counterclockwise, the gear 274 is driven to rotate clockwise, and the upper gear 262B21 is driven to rotate counterclockwise. At this time, the lower gear 262B23 can be driven to rotate counterclockwise. At the same time, the lower gear 262B23 can drive the reciprocating gear 264A to rotate clockwise.

Figure 15:
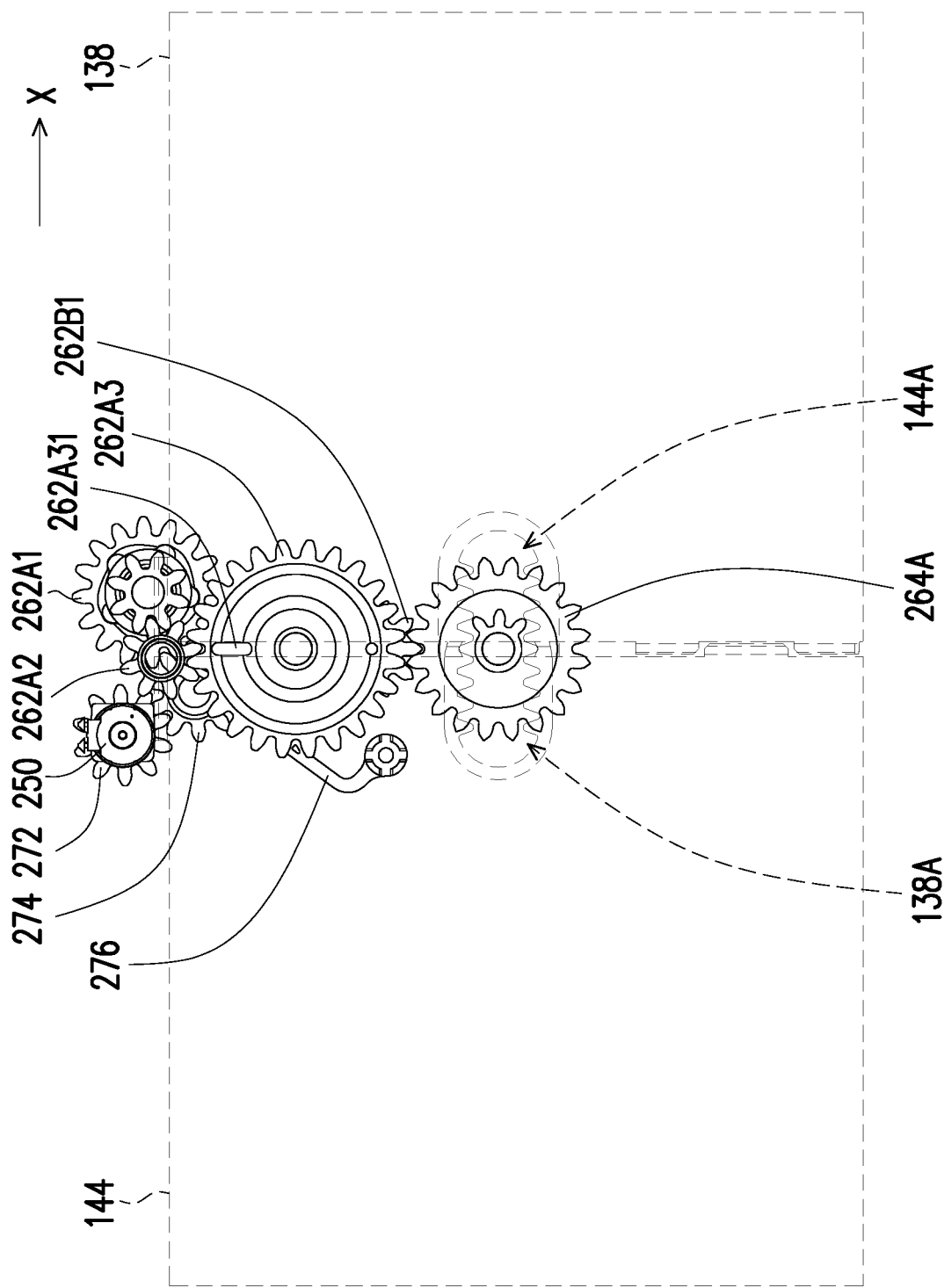
FIG. 15 is a bottom view of FIG. 5.

Teeth 264A1 of the reciprocating gear 264A of the first sub-system 264 fit with an internal gear hole 144A of the outer shell 144 of the second display 140 (marked in FIG. 5). Teeth 264A2 of the reciprocating gear 264A fit with an internal gear hole 138A of the outer shell 138 of the first display 130 (marked in FIG. 5). Therefore, when rotating clockwise, the reciprocating gear 264A drives the first display 130 and the second display 140 to reciprocate on the X axis, so as to adjust the distance between the first display 130 and the second display 140. Therefore, the outer shell 144 and the outer shell 138 can be changed from keeping a relatively long distance from each other as shown in FIG. 13 to being close to each other as shown in FIG. 15. In addition, the teeth 264A1 of the reciprocating gear 264A only contact one side of the internal gear hole 144A of the outer shell 144, and the teeth 264A2 of the reciprocating gear 264A only contact one side of the internal gear hole 138A of the outer shell 138. Therefore, after changing from the state shown in FIG. 13 to the state shown in FIG. 15, the first driver 250 can continue to rotate forward to change from the state shown in FIG. 15 to the state shown in FIG. 13 again.

Figure 16:
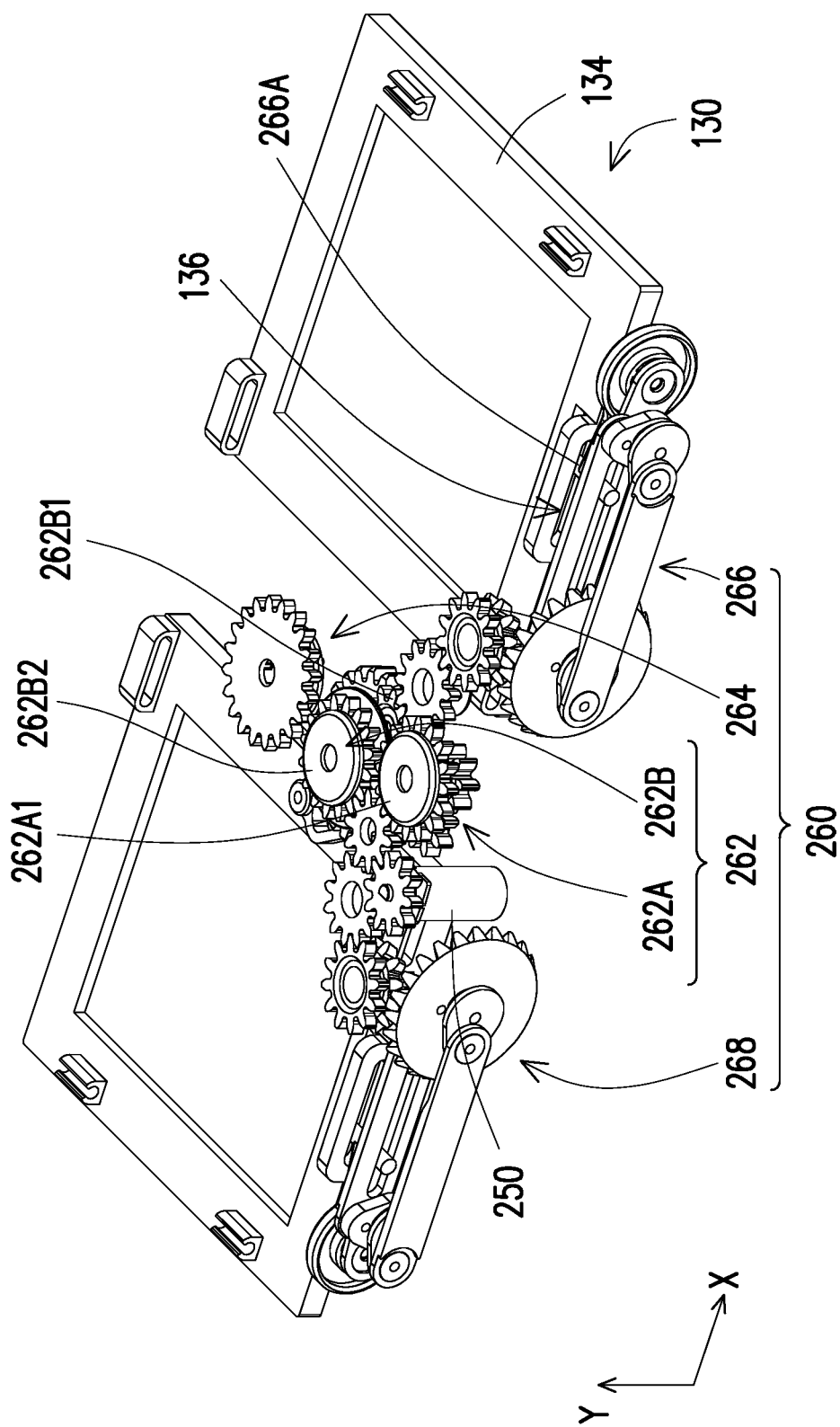
FIG. 16 is a schematic diagram of the head mounted display of FIG. 5 with outer shells of displays removed.
Figure 17:
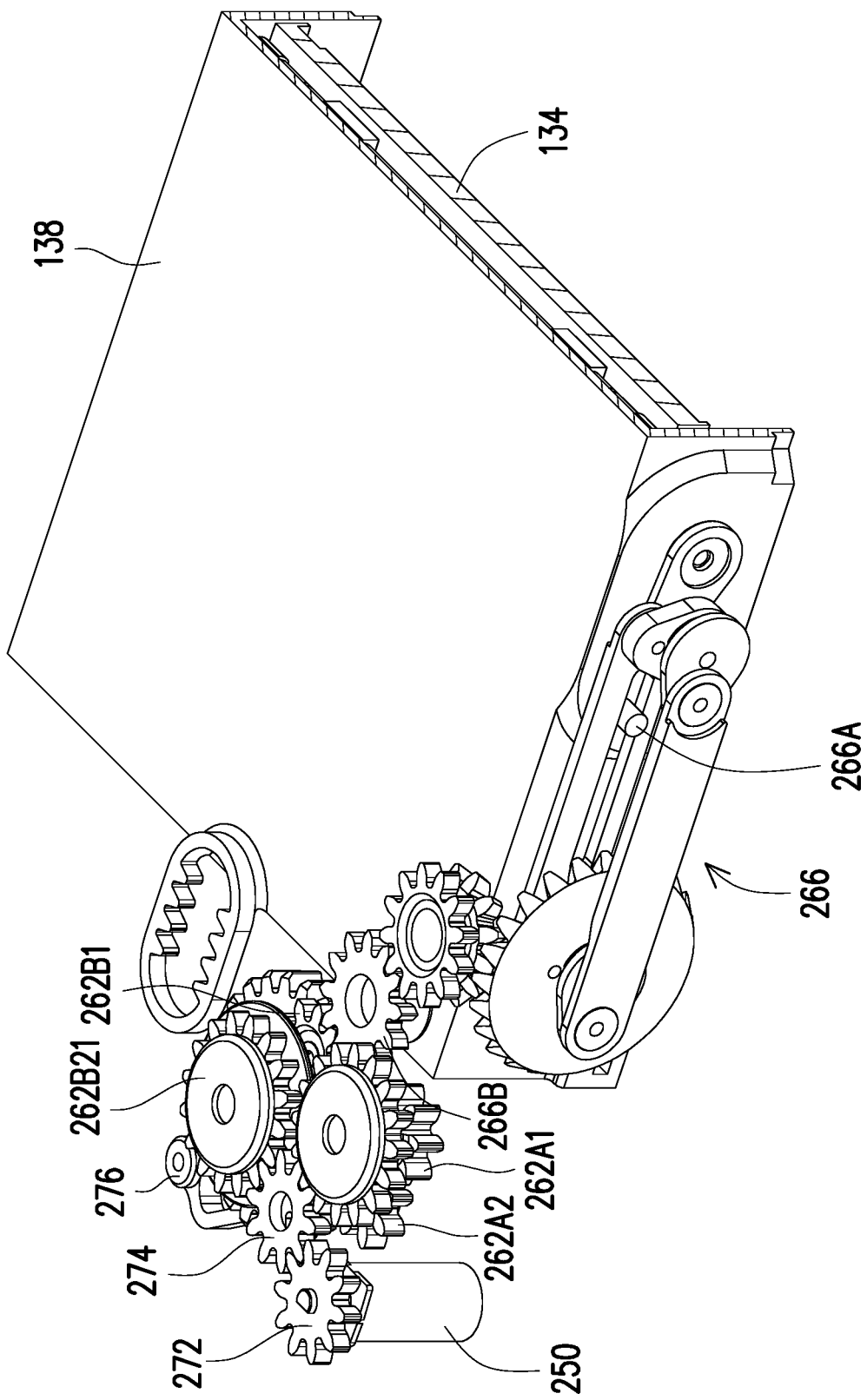
FIG. 17 is a schematic diagram of FIG. 16 with part of elements removed and the outer shell of the first display added.

FIG. 16 is a schematic diagram of the head mounted display of FIG. 5 with outer shells of displays removed. FIG. 17 is a schematic diagram of FIG. 16 with part of elements removed and the outer shell of the first display added. Referring to FIG. 16 and FIG. 17, after the first driver 250 rotates backward (rotates counterclockwise in FIG. 16) to enable the transmission part 262B1 to contact the second sub-system 266 through the gear 262A1 of the transposition system 262A, the first driver 250 changes to rotate forward (rotate clockwise in FIG. 16). When rotating forward to drive the gear 272 to rotate clockwise, the first driver 250 drives the gear 274 to rotate counterclockwise and drives the upper gear 262B21 to rotate clockwise. At this time, the lower gear 262B23 (marked in FIG. 14) can be driven to rotate clockwise. At the same time, the lower gear 262B23 can drive the transmission part 262B1 to rotate counterclockwise and thereby drive a gear 266B of the contacted second sub-system 266 to rotate clockwise. When the rotation of the first driver 250 is indeed transmitted to an output end 266A of the second sub-system 266, the output end 266A of the second sub-system 266 drives the display element 134 through the sliding groove 136 of the display element 134 of the first display 130 to reciprocate on the Y axis. Specifically, the display element 134 reciprocates in a direction close to and away from the first optical system 110 (as shown in FIG. 2). Although the outer shell 138 of the first display 130 is fixed to the first optical system 110, the display element 134 of the first display 130 can move relative to the outer shell 138 of the first display 130. Therefore, the distance between the first optical system 110 and the display element 134 of the head mounted display 200 can be adjusted to meet the needs of users with different eyesight conditions.

Figure 18:
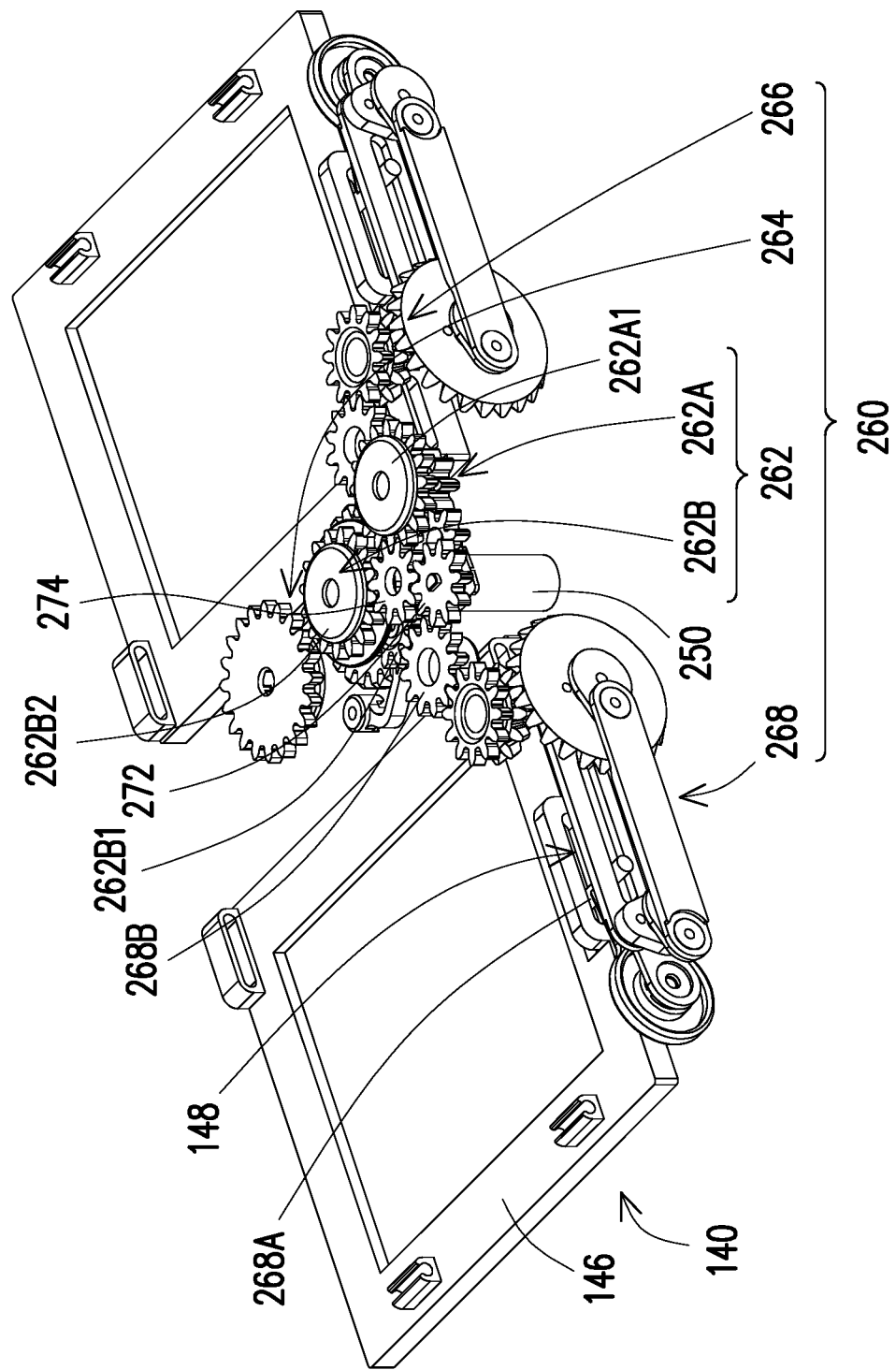
FIG. 18 is a schematic diagram of another state of the head mounted display of FIG. 5 with the outer shells of the displays removed.

FIG. 18 is a schematic diagram of another state of the head mounted display of FIG. 5 with the outer shells of the displays removed. Referring to FIG. 18, after the first driver 250 rotates backward (rotates counterclockwise in FIG. 18) to enable the transmission part 262B1 to contact the third sub-system 268 through the gear 262A1 of the transposition system 262A, the first driver 250 changes to rotate forward (rotate clockwise in FIG. 18). When rotating forward to drive the gear 272 to rotate clockwise, the first driver 250 drives the gear 274 to rotate counterclockwise and drives the upper gear 262B21 to rotate clockwise. At this time, the lower gear 262B23 (marked in FIG. 14) can be driven to rotate clockwise. At the same time, the lower gear 262B23 can drive the transmission part 262B1 to rotate counterclockwise and thereby drive a gear 268B of the contacted third sub-system 268 to rotate clockwise. When the rotation of the first driver 250 is indeed transmitted to an output end 268A of the third sub-system 268, the output end 268A of the third sub-system 268 drives the display element 146 through the sliding groove 148 of the display element 146 of the second display 140 to reciprocate on the Y axis. Specifically, the display element 146 reciprocates in a direction close to and away from the second optical system 120 (as shown in FIG. 2). Although the outer shell 144 (as shown in FIG. 2) of the second display 140 is fixed to the second optical system 120, the display element 146 of the second display 140 can move relative to the outer shell 144 of the second display 140. Therefore, the distance between the second optical system 120 and the display element 146 of the head mounted display 200 can be adjusted to meet the needs of users with different eyesight conditions.

In summary, in the head mounted display of the invention, because of the cooperation of the adjusting systems and the drivers, the distance between two displays and the distance between one display and the optical system can be adjusted with only one driver. Therefore, fewer drivers can be configured in the head mounted display. In addition, if the adjusting systems are properly designed, the distance between the two displays, the distance between the first display and the first optical system and the distance between the second display and the second optical system can be adjusted with only one driver to further reduce the number of drivers.

What is claimed is:

1. A head mounted display, comprising:
    a first optical system;
    a second optical system;
    a first display, assembled to an object side of the first optical system;
    a second display, assembled to an object side of the second optical system;
    a first driver, wherein the first driver is a motor; and
    a first adjusting system, connected to the first driver, the first optical system, the first display and the second display, wherein the first driver drives the first adjusting system to adjust a distance between the first display and the second display in a first mode, and the first driver drives the first adjusting system to adjust a distance between the first display and the first optical system in a second mode,
    wherein the first adjusting system comprises a first sub-system and a second sub-system, when rotating forward, the first driver drives the first sub-system to adjust the distance between the first display and the second display in the first mode, and when rotating backward, the first driver drives the second sub-system to adjust the distance between the first display and the first optical system.

2. The head mounted display of claim 1, further comprising a second driver and a second adjusting system, wherein the second adjusting system is connected to the second optical system and the second display, and the second driver drives the second adjusting system to adjust a distance between the second display and the second optical system in a third mode.

3. The head mounted display of claim 1, wherein the second driver is a motor, the second adjusting system is a gear system, and the second driver drives the second display through the second adjusting system to reciprocate.

4. The head mounted display of claim 1, wherein each of the first sub-system and the second sub-system is a gear system, the first driver drives the first display and the second display through the first sub-system to reciprocate in the first mode, and the first driver drives the first display through the second sub-system to reciprocate in the second mode.

5. The head mounted display of claim 1, further comprising an inner shell, wherein the first sub-system comprises a reciprocating gear and a driven gear, the first driver is fixed to the first display, when the first driver drives the reciprocating gear, the reciprocating gear drives the first display through the first driver to reciprocate relative to the inner shell, and the first display drives the second display through the driven gear to reciprocate relative to the first display.

6. The head mounted display of claim 1, wherein the first adjusting system is further connected to the second optical system, and the first driver drives the first adjusting system to adjust a distance between the second display and the second optical system in a third mode.

7. A head mounted display, comprising:
    a first optical system;
    a second optical system;
    a first display, assembled to an object side of the first optical system;
    a second display, assembled to an object side of the second optical system;
    a first driver, wherein the first driver is a motor; and
    a first adjusting system, connected to the first driver, the first optical system, the first display and the second display, wherein the first driver drives the first adjusting system to adjust a distance between the first display and the second display in a first mode, and the first driver drives the first adjusting system to adjust a distance between the first display and the first optical system in a second mode,
    wherein the first adjusting system is further connected to the second optical system, and the first driver drives the first adjusting system to adjust a distance between the second display and the second optical system in a third mode,
    wherein the first adjusting system comprises a switching system, a first sub-system, a second sub-system, and a third sub-system,
    the switching system connects to the first sub-system and disconnects from the second sub-system and the third sub-system in the first mode,
    the switching system connects to the second sub-system and disconnects from the first sub-system and the third sub-system in the second mode, and
    the switching system connects to the third sub-system and disconnects from the second sub-system and the first sub-system in the third mode.

8. The head mounted display of claim 7, wherein the first driver is a motor, each of the switching system, the first sub-system, the second sub-system and the third sub-system is a gear system, the first driver drives the first display and the second display through the switching system and the first sub-system to reciprocate in the first mode, the first driver drives the first display through the second sub-system to reciprocate in the second mode, and the first driver drives the second display through the first adjusting system and the third sub-system to reciprocate in the third mode.

9. The head mounted display of claim 7, wherein the switching system comprises a transposition system and a transmission system, when rotating backward, the first driver drives the transposition system to move a transmission part of the transmission system to contact the first sub-system, the second sub-system or the third sub-system, and when rotating forward, the first driver drives the transmission part of the transmission system to drive the first sub-system, the second sub-system or the third sub-system that is being contacted.

\* \* \* \* \*